Figure 1:
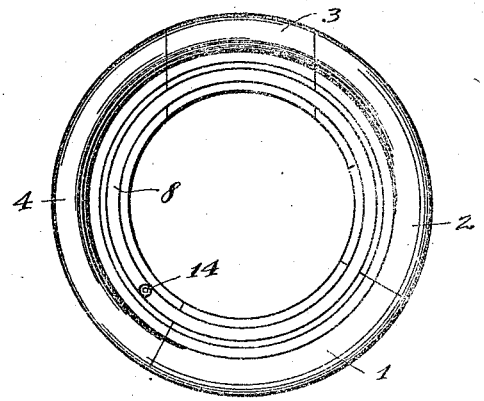

M. D. KUHLKE.
CORE RETAINING DEVICE.
APPLICATION FILED FEB. 14, 1914.

1,140,045.

Patented May 18, 1915.

Witnesses
Hugh B. McGill
J. M. Fromant

Inventor
Martin D. Kuhlke
By Hull & Smith
Attorneys

UNITED STATES PATENT OFFICE.

MARTIN D. KUHLKE, OF AKRON, OHIO.

CORE-RETAINING DEVICE.

1,140,045.  Specification of Letters Patent.  Patented May 18, 1915.

Application filed February 14, 1914. Serial No. 818,637.

*To all whom it may concern:*

Be it known that I, MARTIN D. KUHLKE, a citizen of the United States, residing at Akron, in the county of Summit and State of Ohio, have invented a certain new and useful Improvement in Core-Retaining Devices, of which the following is a full, clear, and exact description, reference being had to the accompanying drawings.

This invention relates to cores for tires and more particularly to the locking means for securing the core segments in operative relation to each other to form a complete core.

It is the general object of the invention to provide a core of the type referred to with an efficient form of locking device; one which can be conveniently applied to and removed from the segments; and one which is simple of construction, economical of production, but extremely efficient in operation.

I accomplish the foregoing objects by the construction illustrated in the drawings forming part hereof wherein—

Figure 2:
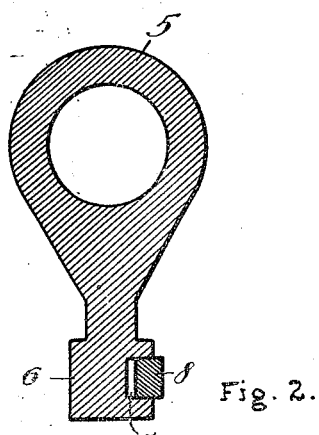
Figure 3:
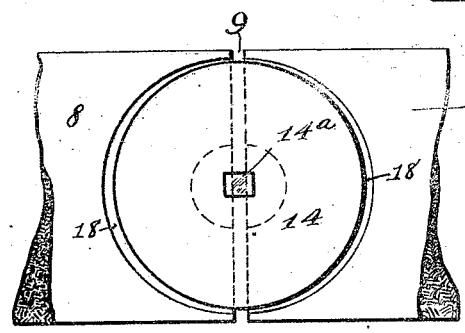

Figure 1 represents a side elevation of a core having my locking device applied thereto; Fig. 2 an enlarged transverse sectional view through the core, showing my locking device in position; Fig. 3 an enlarged detail in elevation of the locking ring with its connecting means; and Fig. 4 a sectional detail of the ring and device shown in Fig. 3.

Figure 4:
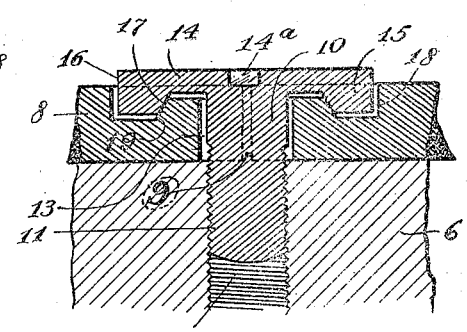

Describing by reference characters the various parts illustrated in the drawings, 1, 2, 3, and 4 denote the segments of a core such as is employed in the manufacture of automobile tires. The construction and arrangement of the segments (with the exceptions to be noted hereinafter) are ordinary. Each core segment comprises an outer portion 5 and an inner shouldered portion 6, the outer portion being preferably hollow for cheapness and lightness of construction. One of the lateral faces of each shouldered portion 6 is provided with an arcuate recess 7, which is preferably rectangular in section. The arcuate recesses jointly form an annular recess which extends continuously around the core segments, said annular recess being adapted to receive the locking ring 8. This locking ring is a split ring and, when inserted in its annular recess or seat, the ends will not be in exact contact but will be spaced a short distance apart, as shown at 9 (Figs. 3 and 4).

The ring is conveniently secured in place and the segments united into a unitary core structure by contracting the ring to cause the inner periphery thereof to bind against the corresponding wall of the annular recess extending around the core segments. This action is conveniently secured through a bolt or stud 10 having a reduced threaded end 11 which is adapted to engage a threaded bore 12 in the shouldered portion 6 of the core. The opposed ends of the ring 8 are recessed, as shown at 13, to receive the body of the bolt 10, sufficient clearance being provided between the wall of each recess and the body of the bolt or stud to permit the ends of the ring to be brought into as close proximity as the inner wall of the annular recess will permit. For the purpose of contracting the ring to clamp the segments together and retain the ring in place, the bolt is provided with a head 14 having an annular peripheral flange 15 projecting at substantially right angles from the head. The outer lateral face 16 of this flange is preferably cylindrical while the inner face 17 is beveled or inclined. The flange 15 is adapted to enter semicircular recesses 18 in the opposed end portions of the ring 8. These recesses are of substantially the same shape as the flange 15, being provided each with an inclined wall 19 which is adapted to be engaged by the inclined surface 17 of the flange whereby, on setting up the bolt or stud 10 (as by means of a socket wrench applied to the angular socket 14ª in the head), the opposed ends of the locking ring are moved toward each other through the wedging action and the inner periphery of the ring is forced into binding engagement with the corresponding peripheral wall of the annular recess extending around the core segments. It will be evident that the bolt or stud 10, with its flanged head, serves, by its adjustment, to bring the ends of the split ring toward each other, thereby to contract the split ring against the inner wall of the annular recess. The bolt, with its flanged head, constitutes a ring-contracting device, which is also a clamping device, which is associated with the core and serves to retain the ring in place within its recess. In order to disassemble the core, it is necessary only to apply a wrench to the socket 14ª and unscrew the stud or bolt 10, thereby permitting the ring to expand sufficiently to be disengaged readily from its annular seat.

Having thus described my invention, what I claim is:

1. The combination, with a core comprising a plurality of segments each having a wall, said walls forming jointly a complete circular wall, of a split ring adapted to engage said wall with its inner peripheral edge, and means connected to one of the core segments and adjustable with respect thereto and adapted by such adjustment to bring the ends of the ring into closer relation to each other and to clamp the ring in place against the wall.

2. The combination, with a core comprising a plurality of segments each having an arcuate recess therein, said recesses forming jointly a complete annular recess, of a split ring in said annular recess, and means associated with one of the core segments and adjustable at right angles to the plane of said ring and adapted to engage opposed portions of said ring and, by such adjustment, to move said portions toward each other.

3. The combination, with a core comprising a plurality of segments each having an arcuate recess therein, said recesses forming jointly a complete annular recess, of a split ring in said annular recess, said ring having near each end portion thereof a recess provided with an inclined surface, and a clamping device associated with one of said segments and adjustable transversely with respect thereto and having inclined surfaces coöperating with the inclined surfaces of the ring whereby to vary the distance between the ends of the ring.

4. The combination, with a core comprising a plurality of segments each having an arcuate recess therein, said recesses forming jointly a complete annular recess, of a split ring in said annular recess, said ring having near each end portion thereof an inclined surface, and a clamping device associated with one of said segments and adjustable transversely with respect to the ring and having inclined surfaces coöperating with the inclined surfaces of the ring whereby to contract the ring.

5. The combination, with a core comprising a plurality of segments each having an arcuate recess therein, said recesses forming jointly a complete annular recess, of a split ring in said annular recess, said ring having in each end portion a recess the face whereof which is nearest the end of such portion being inclined toward such end, and a stud adjustable transversely with respect to the ends of the ring and having an annular flange adapted to enter the said recesses, said flange having an inclined surface adapted to coöperate with the inclined surfaces of the recess to draw the ends of the ring in closer proximity to each other.

6. The combination, with a core comprising a plurality of segments each having an arcuate recess therein, said recesses forming jointly a complete annular recess, of a split ring in said annular recess, said ring having in each end portion a substantially semi-circular recess the face whereof which is nearest the end of such portion being inclined toward such end, a stud or bolt having a thread and the opposed ends of the ring being provided each with a recess for the passage of said stud or bolt, a head on said stud or bolt having an annular flange adapted to enter the semi-circular recesses in the ring, the surface of the flange nearest the stud or bolt being inclined and adapted to engage the inclined surfaces of the recesses whereby, on threading the stud into the appropriate core segment, the ring is contracted through the engagement of the inclined surface of the flange with the inclined surfaces of the recesses.

7. The combination, with a plurality of core segments each having an arcuate recess, said recesses forming jointly a complete annular recess, of a split ring in said annular recess, and means carried by one of said segments and movable transversely of said ring and engaging said ring whereby, through such transverse movement, the ends of said ring are brought toward each other, thereby to clamp the core segments together.

8. The combination, with a plurality of core segments each having an arcuate wall, said walls forming jointly a complete circular wall, of a split ring surrounding said wall, and means adjustably carried by one of said segments and adapted to engage an end of the ring and, by its adjustment, simultaneously to bring one end of the ring toward the other to contract the ring and to clamp the ring in place about said wall.

9. The combination, with a plurality of core segments each having an arcuate recess, said recesses forming jointly a complete annular recess, of a split ring in said annular recess, the end portions of said ring being provided each with an inclined surface, and a bolt or stud threaded into one of the core segments between the opposed ends of the ring, said bolt or stud having a head adapted to extend across the ends of the ring and to engage the inclined surfaces thereof and, by its adjustment, to vary the distance between the ends of the ring, whereby to clamp the segments together.

10. The combination, with a plurality of core segments each having an arcuate wall, said walls forming jointly a complete circular wall, of a split ring surrounding said wall, the end portions of said ring being provided each with an inclined surface, and a bolt or stud threaded into one of the core segments between the opposed ends of the ring, said bolt or stud having a head adapted to extend across the ends of the ring and to engage the inclined surfaces thereof and, by its adjustment, to vary the distance between the ends of the rings, thereby to clamp the segments together.

11. The combination, with a plurality of core segments each having an arcuate wall, said walls forming jointly a complete circular wall extending around the core, of a split ring coöperating with said wall and adapted to fit thereagainst, a device carried by one of said segments and adjustable with respect thereto and adapted to engage said ring and, by its adjustment, to vary the distance between the ends of said ring and to force the ring into engagement with the wall, thereby to lock the segments together.

In testimony whereof, I hereunto affix my signature in the presence of two witnesses.

MARTIN D. KUHLKE.

Witnesses:
  AUT. M. OLIVER,
  RALPH SPRAGUE.